Patented May 6, 1941

2,240,759

UNITED STATES PATENT OFFICE 2,240,759

POPPED CORN FOOD PRODUCT AND METHOD OF PREPARATION

Sheldon S. Chandler, Brooklyn, Wis.

No Drawing. Application June 16, 1939, Serial No. 279,551

3 Claims. (Cl. 99—166)

This invention relates to a popped corn food product and the preservation thereof and more particularly to a process of preserving pop-corn and the like, although certain features thereof may be employed with equal advantage for other products.

It contemplates more especially the assimilation of food nutritious substances such as seasoning and flavoring ingredients with pop-corn and similar food products to improve the nutritious, taste and keeping qualities thereof by agitation and subjection to a drying heat to preserve the original delectable characteristics of the freshly prepared food products while materially adding to the taste and keeping qualities thereof.

Pop-corn, potato chips and other similar tasty foods and confections enjoy the favor of the consuming public and are becoming increasingly popular. The trend is to supply this market with packaged goods capable of retaining its freshness over an extended period of time availing the marketing thereof in much the same manner as staple food products. To this end, pop-corn, potato chips and similar products have been packaged and supplied to the food retailer for resale to the public.

Known packaging methods for these products that are momentarily stable and possessed of fast losing fresh qualities, have not proven entirely satisfactory. While the problem of retaining the original crispy, tasty characteristics of freshly prepared dry foods such as pop-corn and retarding ultimate rancidity for an extended period of time has been partly solved, yet many consumers prefer these qualities in conjunction with the original crispy delectable pop-corn as prepared in the home or served by pop-corn vendors.

However, the sealing of unadulterated pop-corn, combined only with the usual salt and liquid butter, in air-tight paper, Cellophane or metal containers has never proven completely satisfactory in retaining the original taste, appearance and edible characteristics requisite and desirable to the consumer for the reason that butter fats or oils are notably lacking in high stability against rancidification. These products so treated and packaged soon lose their crispy appetizing tastiness, become soft and rancid and consequently unsaleable.

It is thus necessary for the food merchandiser or producer to either limit the sale of the product to the retailer and tavern keeper who stocks it as an accommodation for his customers, or arrange to supply them with fresh stock at frequent intervals in exchange for the old stock which becomes stale and rancid despite air tight sealing. This results in substantial losses to the distributor by reason of the taste failure of such products and their poor keeping qualities coupled with tremendously high merchandising costs.

The desirability to process pop-corn and similar products to effect preservation for an extended period of time in their original crispy, flaky, delectable form and simultaneously improve the taste and keeping qualities thereof and substantially discouraging or retarding the natural tendencies of fats and oils to rancidify, is readily apparent. With the teachings of the present invention, it is proposed to preserve pop-corn and similar products in their original natural form and also improve their taste, edible and keeping characteristics so that such products can be rendered available for distribution through the regular merchandising channels.

One object of the present invention is to provide an improved process for preserving pop-corn and similar food products to improve the keeping and taste qualities thereof.

Another object is to provide a novel preserving process for imparting keeping qualities to food products such as pop-corn and the like so as to retain for an appreciable time the original appearance, taste and edible characteristics possessed by the freshly prepared product.

Still another object is to provide an improved pop-corn product having keeping qualities imparted thereto by processing prior to packaging in appropriate containers for merchandising purposes so as to retain over an extended period of time the delectable taste and edible characteristics possessed by the freshly prepared product.

A further object is to provide pop-corn and similar products with food nutritious seasoning substances intimately mixed therewith by subjection to a dehydrating heat prior to packaging in appropriate containers for merchandising purposes.

A still further object is to improve the taste characteristics and keeping qualities of the packaged food product by incorporating therewith nutritious seasoning ingredients that discourage rancidity and staleness and impart thereto improved taste characteristics.

An additional object is to provide a novel preserving process for pop-corn and similar food products whereby the seasoned product is substantially dehydrated to retain the fresh crispy and original taste qualities thereof for future consumption.

Other objects and advantages will appear from the following description of an illustrative embodiment of the present invention.

The present invention is directed to the preservation of momentarily stable food products such as pop-corn by imparting keeping and taste qualities thereto and materially retarding the rancidification and staleness which soon renders such food products undesirable for consumption, especially when prepared with butter fats and like seasoning ingredients. It has been found that the delectable taste and edible characteristics of the freshly prepared and buttered pop-corn can be enhanced and keeping qualities imparted thereto for an extended period of time by combining therewith a variety of nutritious, non-adulterating seasoning or taste ingredients.

The flavor imparting ingredients are then stabilized in conjunction with the crisp, appetizing food product by subjecting the resulting non-adulterated mixture to a dehydration temperature. It has been found that the partial or complete saturation or coating of the exterior surface of the popped kernels of corn preferably may be effected with a butter fat or oil constituting nutritious and taste imparting ingredients such as vegetable oils, pure tropical vegetable butter, dairy butter, animal fats, vegetable fats, and oil derivatives thereof that may optionally include malt, sugar, salt and other suitable seasoning substances combined therewith. These are intimately admixed with the freshly popped corn and then subjected to an elevated temperature approximating a range between 450° and 500° F.

This results in the substantial elimination of the moisture content simultaneous therewith, materially lessens or retards the usual tendency of the flavoring substances to rancidify after a short period of time. Increasing the stability of the intermixed ingredients over an extended period of time permits the preservation of the resulting product in its original delectable form for future consumption. The smooth, uniform product, while still hot, is then packaged in suitable sealed or semi-sealed containers for future consumption. Experimental tests have indicated that the packaged pop-corn retains the pleasing appearance and taste characteristics of the freshly prepared product with no tendency to appear stale or rancid when opened thirty to forty-five days later.

In the preferred embodiment, selected baby corn suitable for popping purposes, is confined in any suitable heat conducting receptacle such as a kettle or fine mesh wire basket, and subjected to dry roasting heat until the kernels have burst open and puffed-out in their familiar fluffy form. Then nutritious and taste imparting substances such as vegetable, animal or dairy fats or oils with or without seasoning ingredients are slowly added to or poured over the pop-corn while being actively stirred and agitated to obtain a uniformly distributed and intimate mixture that covers the surface of the pop-corn and at least partially permeates therethrough to result in a composite edible food product.

The seasoning ingredients may comprise salt, malt, sugar and similar ingredients that are properly proportioned with the vegetable or animal or dairy fats or oils depending upon the quantity of pop-corn to be treated as will appear more fully hereinafter. Melted tropical vegetable butter has proved very desirable; however, numerous other edible fats and oils of the class mentioned or derivatives thereof, can be used with equal advantage depending upon the dictates of commercial practice. The selected butter, fat or oil serves to impart nutrition and flavor to the resultant product and also serves to retard the oxidation of the sealed-in pop-corn freshness without impairing the digestible, nutritious and original taste qualities thereof.

The preferred constituents and their proportions which have been found desirable, though not absolutely critical, are as follows:

| | Per cent by weight |
|---|---|
| Pop-corn | 60 |
| Butter, fat or oil | 30 |
| Salt, malt, or sugar or their suitable combination | 10 |

These proportions may vary depending upon the dictates of commercial practice and the type of butter, fat or oil that is selected in the treatment prescribed for producing the desired results.

After the freshly prepared pop-corn, nutrition, flavoring and seasoning ingredients have been thoroughly agitated to present the desired uniform and intimate mixture, the food product is placed in a container or containers which, in turn, are treated or subjected to a constant temperature by passing through or momentarily confined in heated ovens or compartments. The temperature range is preferably though not essentially between 450° and 500° F., and the time of this heating treatment at this range may vary depending upon conditions and the character of the products. Under ordinary circumstances, a quantity of approximately ten pounds of the previously agitated mixture should be subjected to the aforesaid temperature range for about seven minutes depending upon the distribution thereof in the elevated temperature zone.

On a large scale production basis, the receptacles containing the mixture to be subjected to the stabilizing dry heat will be carried on endless belt conveyors moving slowly through the heating compartment at a controlled rate of speed so that the required time interval will have elapsed when the containers emerge from said ovens. The receptacles are preferably shallow pans so that the mixture may be spread in a thin layer so that the heat will penetrate thoroughly within the prescribed time.

A few simple tests using various weight units of the predescribed mixture in the fixed proportions, together with corresponding variations in temperature ranges and heating time will determine the requisite time and temperature ranges necessary to obtain the desired resultant, namely, a stabilized food product of uniform nutrition, flavor and appearance, retaining all of the pleasing characteristics of the freshly prepared pop-corn and having the admixed ingredients dried thereon in a uniform thin film that does not readily deteriorate and protects the pop-corn crispness and freshness.

For example, a small quantity of the mixture, approximately ten ounces (6 oz. pop-corn, 3 oz. butter, fat or oil, and 1 oz. salt) may be treated for five minutes at the dehydrating range between 450° and 500° F. to obtain a dry, stable product possessed of the desired keeping, nutrition and flavor qualities. The individual popped kernels may be completely or partially saturated with the nutrition, flavoring and seasoning ingredients or the surface thereof merely provided with a uniform protective film to present a crispy, crunchy, and delectable edible product which is desirable for consumption over an extended time after preparation.

When the heating process has been completed and the product removed from the oven, it is packed, while hot, in suitable containers which may be either the sealed or semi-sealed type. Market conditions and methods of merchandising will be a factor in determining the type of package to be used. Metal cans, glass jars, and paper or Cellophane bags are among many types of containers available for marketing and use. With the teachings of the present invention, an improved product and a simple effective process is provided for preserving pop-corn and similar products for future consumption by insuring the retention in the packaged product of the tender, crispy, tasty and pleasing characteristics possessed by the freshly prepared product.

It is to be noted that the popped kernels of corn serve as a matrix for the nutritious flavoring and seasoning ingredients partially permeating therethrough and forming a dry film or coating thereon after subjection to a dehydrating heat. The dry film also serves to seal the pop-corn matrix against oxidation, thus effectively preserving the requisite freshness desirable to the consumer for an extended period of time after preparation. The dehydrated film of flavoring substances does not rancidify nor deteriorate over an extended period of time and materially adds to the flavor thereof. By confining the hot resulting product in a sealed container, the atmosphere of the container interior is dehydrated by the heat inherent in the contents and the container tightly seals the contents thereafter.

Various changes may be made in the embodiment of the invention herein specifically described without departing from or sacrificing any of the advantages thereof, and nothing herein shall be construed as limitations upon the invention or its concept as to the whole or any part thereof except as defined in the appended claims.

I claim:

1. A preserving process which consists in admixing nutritious flavoring ingredients belonging to the class of vegetable and animal fats or oils with freshly prepared pop-corn serving as a matrix therefor, heating the mixture at a constant temperature that is sufficiently high and for a period sufficient to cause dehydration and provide a dry protective film over the surface of said pop-corn, and then packaging the heated resulting product in suitable containers for marketing and future consumption.

2. A preserving process which consists in admixing a fixed proportion of nutritious flavoring and seasoning ingredients belonging to the class of vegetable and animal fats or oils with a fixed proportion of freshly prepared pop-corn serving as a matrix therefor, said nutritious flavoring and seasoning ingredients initially comprising approximately 40% by weight and the matrix comprising approximately 60% by weight of the total mixture, heating the mixture at a constant temperature that is sufficiently high and for a period sufficient to cause dehydration and provide a dry protective film over the matrix, actively stirring the mixture during the heating thereof, and then packaging the heated resulting product in suitable containers for marketing and future consumption.

3. A food product comprising a matrix of freshly popped corn having a dried anhydrous film thereon of nutritious flavoring substances belonging to the class of edible vegetable and animal fats or oils together with a seasoning ingredient, said dried film serving as a protective covering possessing keeping and taste qualities effective for matrix preservation in substantially its initially popped condtion over an extended period of time.

SHELDON S. CHANDLER.